US012783506B2

(12) United States Patent
Weiner et al.

(10) Patent No.: US 12,783,506 B2
(45) Date of Patent: Nov. 3, 2026

(54) RULES MANAGEMENT FRAMEWORK FOR HETEROGENEOUS QUESTIONS AND ANSWERS MAPPING USING ARTIFICIAL INTELLIGENCE

(71) Applicant: BOLT Solutions, Inc., Austin, TX (US)

(72) Inventors: Philip Weiner, Singapore (SG); Oleg Zlodkov, Ashdod City (IL); Romain Barraud, Kowloon (HK)

(73) Assignee: BOLT Solutions, Inc., Austin, TX (US)

( * ) Notice: Subject to any disclaimer, the term of this patent is extended or adjusted under 35 U.S.C. 154(b) by 0 days.

(21) Appl. No.: 19/025,190

(22) Filed: Jan. 16, 2025

(65) Prior Publication Data

US 2025/0231933 A1 Jul. 17, 2025

Related U.S. Application Data

(60) Provisional application No. 63/621,388, filed on Jan. 16, 2024.

(51) Int. Cl.
*G06F 17/00* (2019.01)
*G06F 7/00* (2006.01)
(Continued)

(52) U.S. Cl.
CPC ...... *G06F 16/243* (2019.01); *G06F 16/24578* (2019.01); *G06F 16/248* (2019.01)

(58) Field of Classification Search
CPC . G06F 16/243; G06F 16/24578; G06F 16/248
(Continued)

(56) References Cited

U.S. PATENT DOCUMENTS 10,692,006 B1 6/2020 Zhang
11,960,827 B1 * 4/2024 Chao .................... G06F 16/986
(Continued)

OTHER PUBLICATIONS

PCT Patent Application PCT/US2025/11858 International Search Report and Written Opinion of the International Searching Authority issued Mar. 17, 2025.

*Primary Examiner* — Pavan Mamillapalli
(74) *Attorney, Agent, or Firm* — Erise IP, P.A.

(57) ABSTRACT

Systems, methods, and computer-readable media for mapping third-party specific question-and-answer pairs to standardized insurance-related question-and-answer pairs. A system may communicate with a third party and may receive third-party specific question-and-answer pairs. The system may include a rules management framework for mapping third-party specific question-and-answer pairs to standardized question-and-answer pairs. The rules management framework may interface with a library for housing the standardized question-and-answer pairs. The rules management framework may interface with a machine learning model to generate a similarity score between the third-party specific question-and-answer pairs and the standardized question-and-answer pairs. The system may include an ordering engine for ordering the questions of the standardized question-and-answer pairs. The system may include an error detection module for flagging when a third party indicates an error is present in the standardized question-and-answer pairs.

20 Claims, 4 Drawing Sheets

(51) Int. Cl.
*G06F 16/242* (2019.01)
*G06F 16/2457* (2019.01)
*G06F 16/248* (2019.01)

(58) Field of Classification Search
USPC .......................................................... 707/723
See application file for complete search history.

(56) References Cited

U.S. PATENT DOCUMENTS

2018/0329880 A1 11/2018 Galitsky
2020/0019876 A1* 1/2020 Appel ...................... G06N 5/04
2020/0356604 A1* 11/2020 Macdougall ........... G06N 20/00
2021/0158451 A1* 5/2021 Blazek ................... G06Q 40/08
2023/0005070 A1* 1/2023 Nguyen .............. G06F 16/3329
2025/0232111 A1* 7/2025 Harsola ................... G06F 40/40

* cited by examiner

RULES MANAGEMENT FRAMEWORK FOR HETEROGENEOUS QUESTIONS AND ANSWERS MAPPING USING ARTIFICIAL INTELLIGENCE

RELATED APPLICATIONS

This patent application shares certain subject matter in common with earlier-filed U.S. Provisional Patent Application No. 63/621,388 titled "RULES MANAGEMENT FRAMEWORK FOR HETEROGENEOUS QUESTIONS AND ANSWERS MAPPING USING ARTIFICIAL INTELLIGENCE," filed Jan. 16, 2024. The above-referenced patent application is hereby incorporated by reference in its entirety into the present application.

BACKGROUND

1. Field

Embodiments of the present disclosure relate to underwriting systems. More specifically, embodiments of the present disclosure relate to rules management frameworks for mapping third-party question-and-answer pairs.

2. Related Art

Consumers often desire to receive insurance quotes from the greatest number of insurers available for the purpose of comparison during the insurance application and purchasing process. In order to provide consumers with insurance quotes, insurers generally have to engage in underwriting. Underwriting is the process of determining the risk associated with a customer and the amount to quote a particular customer. The difference in quoted amounts across different insurers often has to do with differences in underwriting, amongst other factors. A source of differences in underwriting may be in the questions an insurer asks and/or the answers the insurer expects to receive. Often, insurers view underwriting questions as a key part of the differentiation between insurers, and there is no standardization across insurers regarding the questions asked and answers accepted. For example, one insurer might ask, "What is your gender?" and expect an answer of "female" or "male," while another insurer may ask the same question and expect an answer of "female," "male," or "other."

As such, creating a singular set of questions for providing quotes to consumers from multiple insurers may prove difficult. In particular, consumers likely only want to answer a particular question once, despite the fact that multiple insurers may ask that question in different ways and expect to receive different answers. As such, it is desirable to ask a single question such that the answer is acceptable (or can be mapped) across all insurers requiring corresponding information. Thus, questions from specific insurers may be matched or "mapped" to a standardized question list such that a single set of questions can result in quotes being provided by any insurers whose questions were mapped to the standardized question list. Mapping may be a labor-intensive process when done manually because insurers may ask a large number of questions during the underwriting process. As such, systems and methods that provide an automated mapping process for insurer-specific questions and answers to standardized questions and answers are desired.

SUMMARY

In some aspects, the techniques described herein relate to one or more non-transitory computer-readable media including computer-executable instructions that, when executed by at least one processor, perform a method of managing a standardized question and answer set, the method including: training a machine learning model to determine a predictive score based on a similarity level between a third-party specific question and a standardized question; receiving a third-party specific question and answer set from a third-party provider, the third-party specific question and answer set including the third-party specific question; determining, using a trained machine learning model, the predictive score for the third-party specific question from the third-party specific question and answer set, the predictive score associated with a similarity between the third-party specific question and the standardized question from the standardized question and answer set; determining if the predictive score exceeds a predetermined threshold; and in response to the predictive score exceeding the predetermined threshold, mapping the third-party specific question to the standardized question.

In some aspects, the techniques described herein relate to one or more non-transitory computer-readable media, wherein the method further includes: in response to the predictive score being less than the predetermined threshold, generating a new standardized question corresponding to the third-party specific question, wherein the standardized question is an existing standardized question.

In some aspects, the techniques described herein relate to one or more non-transitory computer-readable media, wherein the method further includes: developing an ordering of the standardized question and answer set such that one or more standardized questions from the standardized question and answer set are presented to a user in the ordering.

In some aspects, the techniques described herein relate to one or more non-transitory computer-readable media, wherein the ordering minimizes a number of standardized questions asked to the user.

In some aspects, the techniques described herein relate to one or more non-transitory computer-readable media, wherein the machine learning model is trained using prompt engineering.

In some aspects, the techniques described herein relate to one or more non-transitory computer-readable media, wherein the method further includes: in response to the predictive score being less than the predetermined threshold, providing information indicative of the predictive score, wherein the information is provided to a system administrator.

In some aspects, the techniques described herein relate to one or more non-transitory computer-readable media, wherein the method further includes: in response to providing the information indicative of the predictive score, receiving, from the system administrator a manual mapping of the third-party specific question.

In some aspects, the techniques described herein relate to a method for managing a standardized question and answer set, the method including: training a machine learning model to determine a predictive score based on a similarity level between a third-party specific question and an existing standardized question from the standardized question and answer set; receiving a third-party specific question and answer set from a third-party provider; determining, using a trained machine learning model, the predictive score for the third-party specific question from the third-party specific question and answer set, the predictive score associated with a similarity between the third-party specific question and the existing standardized question from the standardized question and answer set; determining if the predictive score exceeds a predetermined threshold; in response to the predictive score exceeding the predetermined threshold, mapping the third-party specific question to the existing standardized question; and in response to the predictive score being less than the predetermined threshold, generating a new standardized question corresponding to the third-party specific question.

In some aspects, the techniques described herein relate to a method, the method further including: determining, using the trained machine learning model, a second predictive score for a third-party specific answer to the third-party specific question, the second predictive score associated with the similarity between the third-party specific answer and a standardized answer to the existing standardized question, wherein the predictive score is a first predictive score.

In some aspects, the techniques described herein relate to a method, further including: monitoring a communication channel associated with the third-party provider; and receiving, through the communication channel, information indicative of an error.

In some aspects, the techniques described herein relate to a method, further including: refining the machine learning model, wherein the machine learning model is refined based on the error.

In some aspects, the techniques described herein relate to a method, wherein the machine learning model implements a large language model for determining requested information associated with the third-party specific question.

In some aspects, the techniques described herein relate to a method, the method further including: determining, using the trained machine learning model, a second predictive score for a second third-party specific question from the third-party specific question and answer set, the predictive score associated with the similarity between the second third-party specific question and the existing standardized question from the standardized question and answer set, wherein the predictive score is a first predictive score and the third-party specific question is a first third-party specific question; determining whether a difference between the first predictive score and the second predictive score is less than a second predetermined threshold, wherein the predetermined threshold is a first predetermined threshold; and in response to the difference being less than the second predetermined threshold, providing an indication to a system administrator.

In some aspects, the techniques described herein relate to a method, wherein the standardized question and answer set is associated with insurance underwriting.

In some aspects, the techniques described herein relate to a system for managing a standardized question and answer set, the system including: a rules mapping engine operable to map a third-party specific question and answer set to the standardized question and answer set; a machine learning model operable to determine a predictive score based on a similarity level between a third-party specific question from the third-party specific question and answer set and a standardized question from the standardized question and answer set; and one or more non-transitory computer-readable media including computer-executable instructions that, when executed by at least one processor, perform a method of managing the standardized question and answer set, the method including: receiving the third-party specific question and answer set from a third-party provider; determining, using the machine learning model, the predictive score for the third-party specific question from the third-party specific question and answer set, the predictive score associated with a similarity between the third-party specific question and the standardized question from the standardized question and answer set; determining if the predictive score exceeds a predetermined threshold; and in response to the predictive score exceeding the predetermined threshold, mapping, by the rules mapping engine, the third-party specific question to the standardized question.

In some aspects, the techniques described herein relate to a system, further including: an error detection module operable to detect an error in the standardized question and answer set.

In some aspects, the techniques described herein relate to a system, wherein the method further includes: detecting, by the error detection module, the error in the standardized question and answer set after the standardized question and answer set, wherein the error is detected after a set of user answers associated with the standardized question and answer set is presented to the third-party provider.

In some aspects, the techniques described herein relate to a system, wherein detecting the error includes: receiving, from the third-party provider, information indicative of the error in the standardized question and answer set.

In some aspects, the techniques described herein relate to a system, wherein the method further includes: in response to the predictive score being less than the predetermined threshold, generating, by the rules mapping engine, a new standardized question corresponding to the third-party specific question, wherein the standardized question is an existing standardized question.

In some aspects, the techniques described herein relate to a system, wherein the third-party provider is an entity engaging in underwriting.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
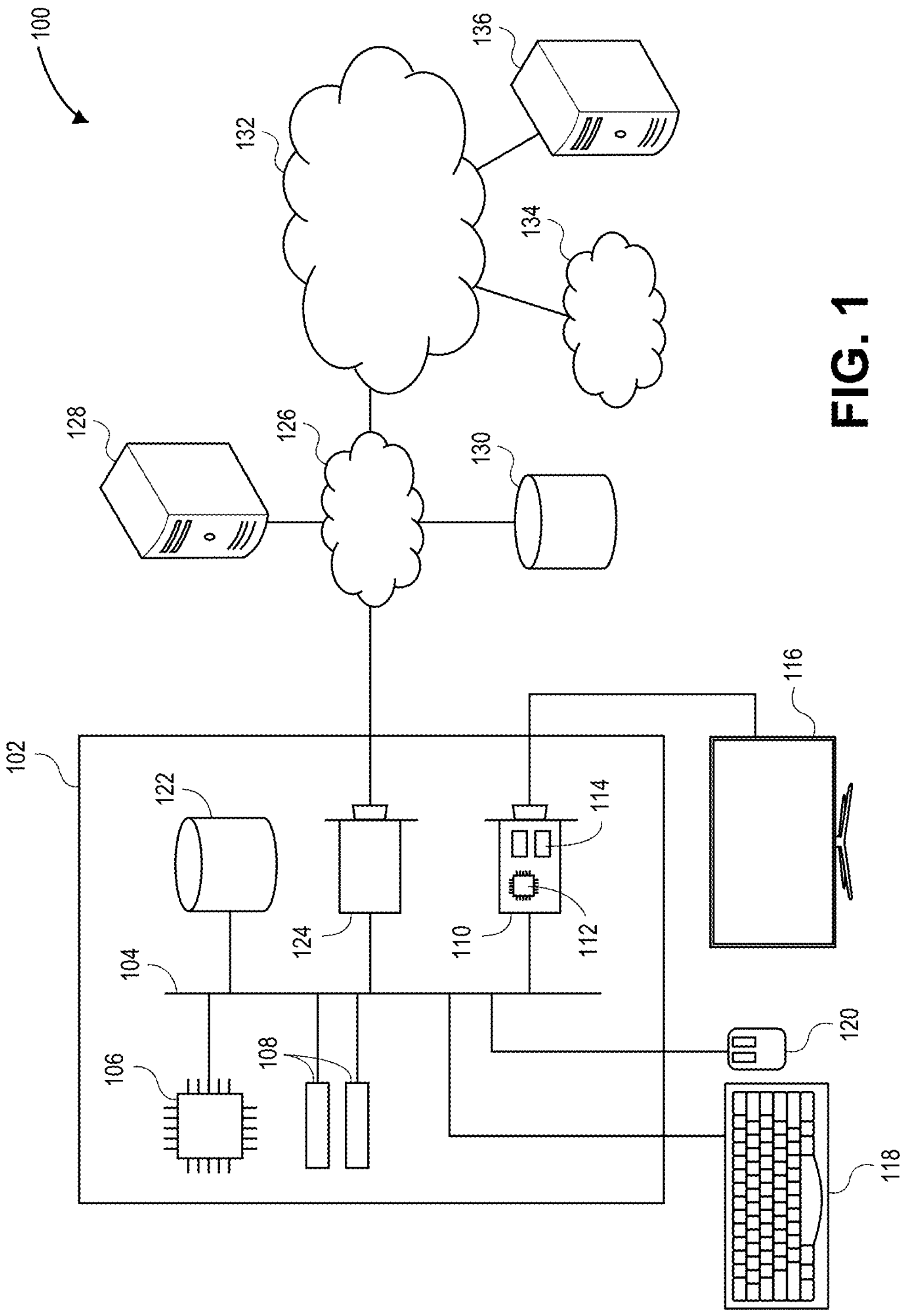
FIG. 1 depicts an exemplary hardware system in accordance with embodiments of the invention.

The drawing figures do not limit the present disclosure to the specific embodiments disclosed and described herein. The drawings are not necessarily to scale; emphasis is instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Similarly, unless otherwise specified, general references to "machine learning," or "artificial intelligence" do not necessarily refer exclusively to those methods discussed herein but include a range of methods within the wider field of data science, including, but not limited to, the range of deep learning to prompt engineering. Thus, the technology can include a variety of combinations and/or integrations of the embodiments described herein.

The present invention relates to systems, methods, and computer-readable media for mapping third-party specific question-and-answer pairs to standardized question-and-answer pairs. In some embodiments, the system may communicate with a third party and may receive third-party-specific question-and-answer pairs. In some embodiments, the system may include a rules management framework for mapping third-party specific question-and-answer pairs to standardized question-and-answer pairs. In some embodiments, the rules management framework may interface with a library for housing the standardized question-and-answer pairs. In some embodiments, the rules management framework may interface with a machine learning model to generate a similarity score between the third-party specific question-and-answer pairs and the standardized question-and-answer pairs. In some embodiments, the system may include an ordering engine for ordering the questions of the standardized question-and-answer pairs. In some embodiments, the system may include an error detection module for flagging when a third party indicates an error is present in the standardized question-and-answer pairs.

FIG. 1 illustrates an exemplary hardware platform relating to some embodiments of the present disclosure. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein, such as backup or versioning. Data stores can be local to a single computer, such as computer 128, accessible on a local network, such as local network 126, or remotely accessible over Internet 132. Local network 126 is, in turn, connected to Internet 132, which connects many networks such as local network 126, remote network 134, or directly attached computers such as computer 136. In some embodiments, computer 102 can itself be directly connected to Internet 132.

Figure 2:
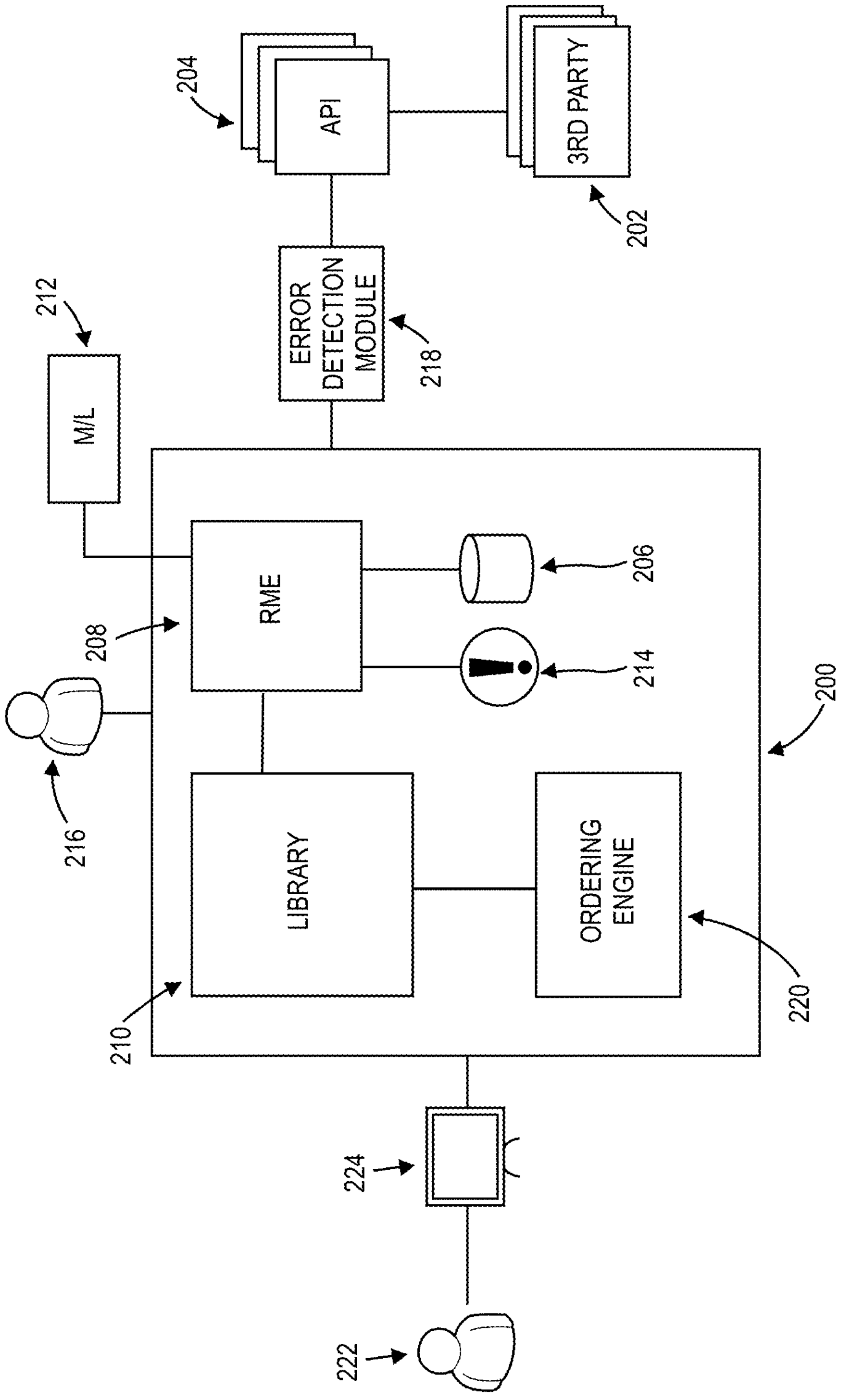
FIG. 2 depicts an exemplary system for managing and mapping third-party specific question-and-answer pairs to standardized question-and-answer pairs in accordance with embodiments of the invention.

To continue, FIG. 2 depicts an exemplary system for managing and mapping third-party specific question/answer pairs to standardized question/answer pairs, generally referred to as system 200. It is herein noted that simply referring to "questions" or "answers" may encompass both questions and answers. At a high level, the system may ask a user any number of questions in order to provide the user with one or more quotes for insurance from one or more third-party insurers. However, it may be desirable to prevent repetitive questions and answers asked by one or more third-party insurers. Accordingly, rules management framework 208 may map a third-party-specific question-and-answer pair to a standardized question-and-answer pair by mapping it to an existing standardized question-and-answer pair or generating a new question-and-answer pair.

In some embodiments, system 200 may interface with a third-party insurer 202 through API 204. Third-party insurer 202 may be any number of third parties, including a singular party or a plurality of parties. In some embodiments, third-party insurer 202 may be an insurance provider engaging in underwriting or any other third party requiring information from the user. System 200 may interface with third-party insurer 202 through API 204 to receive information from third-party insurer 202, to transmit information to third-party insurer 202, or to both transmit information to and receive information from third-party insurer 202. API 204 may be a singular API for interfacing with one or more third parties or a plurality of APIs for interfacing with one or more third parties.

In some embodiments, by interfacing with third-party insurer 202 through API 204, system 200 may receive third-party-specific question-and-answer pairs. For example, a third-party insurer may provide a questionnaire to solicit the information needed to provide a quote. At a high level, third-party specific and question-and-answer pairs may include questions and the corresponding answers recognized by third-party insurer 202. For example, a question may be, "What is your gender," while the corresponding answers may be "female" or "male." The question-and-answer pairs may be third-party specific such that they may differ in any number of ways from the questions of other third parties and/or the standardized question-and-answer pairs of system 200. For example, a first third party may ask about roof shape, while a second third party may not ask about roof shape, instead asking about the age of the roof. For another example, a first third party may present a user with two answer choices when asked about gender, while a second third party may present the user with three answer choices.

In some embodiments, upon receipt of the third-party specific question-and-answer pairs by system 200, the third-party specific question-and-answer pairs may be stored in third-party data store 206. Third-party data store 206 may be any data store now known or later developed, including, but not limited to, internal data stores, external data stores, a singular data store, a plurality of data stores, cloud-based data stores, and the like. By storing the third-party specific question-and-answer pairs in third-party data store 206, other components of system 200, such as rules management framework 208, may access the third-party specific question-and-answer pairs. However, it is noted herein that components of system 200 may access the third-party specific question-and-answer pairs without the need for the third-party specific question-and-answer pairs to be stored in third-party data store 206.

In some embodiments, system 200 may include rules management framework 208 for mapping the third-party specific question-and-answer pairs to standardized question-and-answer pairs housed in library 210. At a high level, rules management framework 208 may receive a third-party specific question and/or answer, determine a predictive score for the question and/or answer, and map the third-party specific question and/or answer to a standardized question and/or answer based on the predictive score. The predictive score may correspond to the similarity between a third-party specific question and/or answer and a pre-existing standardized question and/or answer. In some embodiments, any number of predictive scores may be generated for a given third-party-specific question and/or answer. For example, a predictive score may be generated for every pre-existing standardized question, where the predictive scores compare the third-party specific question to every preexisting standardized question. Accordingly, it may then be determined which preexisting standardized question best matches the third-party-specific question.

In some embodiments, as mentioned above, a predictive score may correspond to the similarity of a third-party-specific question to a given standardized question. The predictive score may then be used to match the third-party-specific question to a standardized question. Any number of characteristics of a question and/or answer may be evaluated to determine similarity, including, but not limited to, words used, syntax, embeddings, length of question and/or answer, terms, qualifiers, modifiers, structure, information sought, and historical data comprising question-and-answer pairs for historical users. For example, the structure of the answer may be evaluated to determine the similarity of answer choices, such as whether the answers are presented as multiple choice, fill-in-the-blank, or numerical answers.

In some embodiments, rules management framework 208 may map a third-party-specific question to the standardized question that has the highest predictive score and is thus the most similar to the third-party-specific question. Accordingly, system 200 may then present the standardized question to a user to solicit information satisfying the requirements of the third party to where the third party can present a quote. In some embodiments, the standardized answer provided by the user may be mapped back to a corresponding third-party-specific answer. For example, if a standardized question solicits the age of a customer's roof and the third-party insurer only wants to know if the roof is older than 20 years, then any standardized answer greater than 20 may be mapped to the third-party-specific answer "yes," while any standardized answer greater less than or equal to 20 may be mapped to the third-party-specific answer "no." Furthermore, the standardized answer may be mapped to a different third-party-specific answer for each third-party insurer. Continuing the previous example, a second third-party insurer may instead ask for the year the roof was installed. For the second third-party insurer, the standardized example may be determined by subtracting the age from the current year.

In some embodiments, rules management framework 208 may interface with machine learning model 212 to generate predictive scores corresponding to a third-party-specific question to identify the standardized question most likely to solicit the information needed to answer the third-party-specific question. Machine learning model 212 is discussed more below as it relates to machine learning model 312 depicted in FIG. 3. As discussed below, machine learning model 212 may be trained and used to analyze a third-party specific question and a standardized question and generate a predictive score based on any number of factors, such as how similar the questions are. Machine learning model 212 may be trained using any suitable training data sets now known or later developed, including, but not limited to, data sets based on previous question-and-answer mappings, third-party guidance, and the like. Further, machine learning model 212 may be trained to process and understand human language, such as through the use of natural language processing. For example, machine learning model 212 may be trained to understand what information a given third-party-specific question is soliciting. Furthermore, machine learning model 212 may be tuned and/or adjusted using prompt engineering techniques to develop the predictive score. For example, machine learning model 212 may include a series of prompts, which may then be used to refine a large language model.

In some embodiments, rules management framework 208 may indicate, with risk indicator 214, when a predictive score falls below a predetermined threshold. Generally, the predetermined threshold may correspond to the amount of risk that system 200 may tolerate regarding the correctness of the mapping of a third-party-specific question to a standardized question. Accordingly, risk indicator 214 may indicate when a predictive score falls below a predetermined threshold and, therefore, is not within the risk tolerance of system 200. For example, a predetermined threshold may be defined as 75%, meaning the system may tolerate risk associated with questions and/or answers that are at least 75% similar to a standardized question and/or answer.

Accordingly, a third-party-specific question may then fall below the predetermined threshold if the third-party-specific question is only 74% similar to a standardized question. As such, risk indicator 214 may indicate that the 74% predictive score falls below the 75% threshold. Upon indicating when a predictive score falls below a predetermined threshold, risk indicator 214 may indicate to a system administrator 216. Accordingly, system administrator 216 may then intervene and manually map the third-party-specific question to a standardized question and/or prompt the system to generate a new standardized question. System administrator 216 may be any party suitable for management of system 200, including, but not limited to, a person, an additional system, and the like.

In some embodiments, risk indicator 214 may indicate when, for a given third-party specific question, the highest predictive score and the second highest predictive score are within a predetermined range of one another. For example, with a predetermined range of 5%, risk indicator 214 may indicate when the highest predictive score is 95%, and the second-highest predictive score is 93%. Consequently, this may indicate the need for intervention to determine the proper mapping of the corresponding third-party-specific question.

In the event that rules management framework 208 is called upon to generate a new standardized question and/or answer, natural language processing, a large language model, and the like may be utilized to formulate the new standardized question and/or answer to match the tone, syntax, style, etc. of the preexisting standardized question and answer set.

After mapping third-party question-and-answer pairs to the standardized question-and-answer pairs, in some embodiments, error detection module 218 may interface with third-party insurer 202 to determine when an error exists in the standardized question-and-answer mapping. In some embodiments, error detection module 218 may listen between system 200 and third-party insurer 202 in order to flag when an error has been sent from third-party insurer 202 to system 200. For example, error detection module 218 may detect when third-party insurer 202 determines that it does not have enough information to provide a quote based on the standardized question-and-answer pairs. Alternatively, or in addition, error detection module 218 may detect errors returned by the API 204 of third-party insurer 202.

In some embodiments, system 200 may include ordering engine 220. In some situations, certain questions may need to be asked before other questions. Broadly, ordering engine 220 may organize the standardized question-and-answer pairs housed by library 210 such that the standardized question-and-answer pairs are asked in a logically correct order, and unnecessary questions can be omitted. For example, it may be desirable to ask whether a customer owns a vehicle before asking what the make and model of that vehicle is. For another example, some questions may be specific to a particular location of the customer. As such, it may be desirable to ask a customer their location before asking questions specific to that location.

In some embodiments, ordering engine 220 may structure the order of the standardized questions asked to a user prior to presenting any of the standardized questions to the user. In other embodiments, ordering engine 220 may structure the order of the standardized questions in real time such that the structure is dependent on answers provided by the user. Ordering engine 220 may be a fully manual system, a fully automatic system, or a combination of automatic and manual systems. In some embodiments, ordering engine 220 may utilize machine learning to determine an optimal order of questions to present a user such that the user is presented with the minimum number of questions to receive quotes from third-party insurers. For example, if a particular question is only required by a third-party insurer who does not provide coverage to the user's geographic area, that question can be omitted once the user's location has been determined.

In some embodiments, the standardized question-and-answer pairs housed in library 210 are presented to user 222 through user interface 224. User 222 may be any person or entity including, but not limited to, a person, a person seeking insurance, a company seeking insurance, a representative of a person or business seeking insurance, an automated system, and the like. User interface 224 may be any interface now known or later developed, including, but not limited to, a computer associated with user 222, a web application, a smartphone app, and the like. User interface 224 may be a third-party system or part of the same system as library 210. In some embodiments, system 200 may offer many or all of these user interface options to accommodate the needs of different users.

Upon presenting the standardized questions, user 222 may provide answers that can be mapped to third-party specific answers and transmitted to third-party insurer 202. As discussed above, third-party insurer 202 may then undertake any number of actions including, but not limited to, providing a quote, determining that an error is present in the answers of user 222, or determining additional questions may need to be answered by user 222 to provide a quote. Upon determining whether an error is present or more questions need to be answered, the error detection module 218 may then flag the presence of an error in the standardized question and answer list housed in library 210, at which point rules management framework 208 may remap the third-party-specific questions and answers. Alternatively, or in addition, the third-party-specific questions and answers may be remapped periodically or in response to a cumulative error rate exceeding a threshold.

Figure 3:
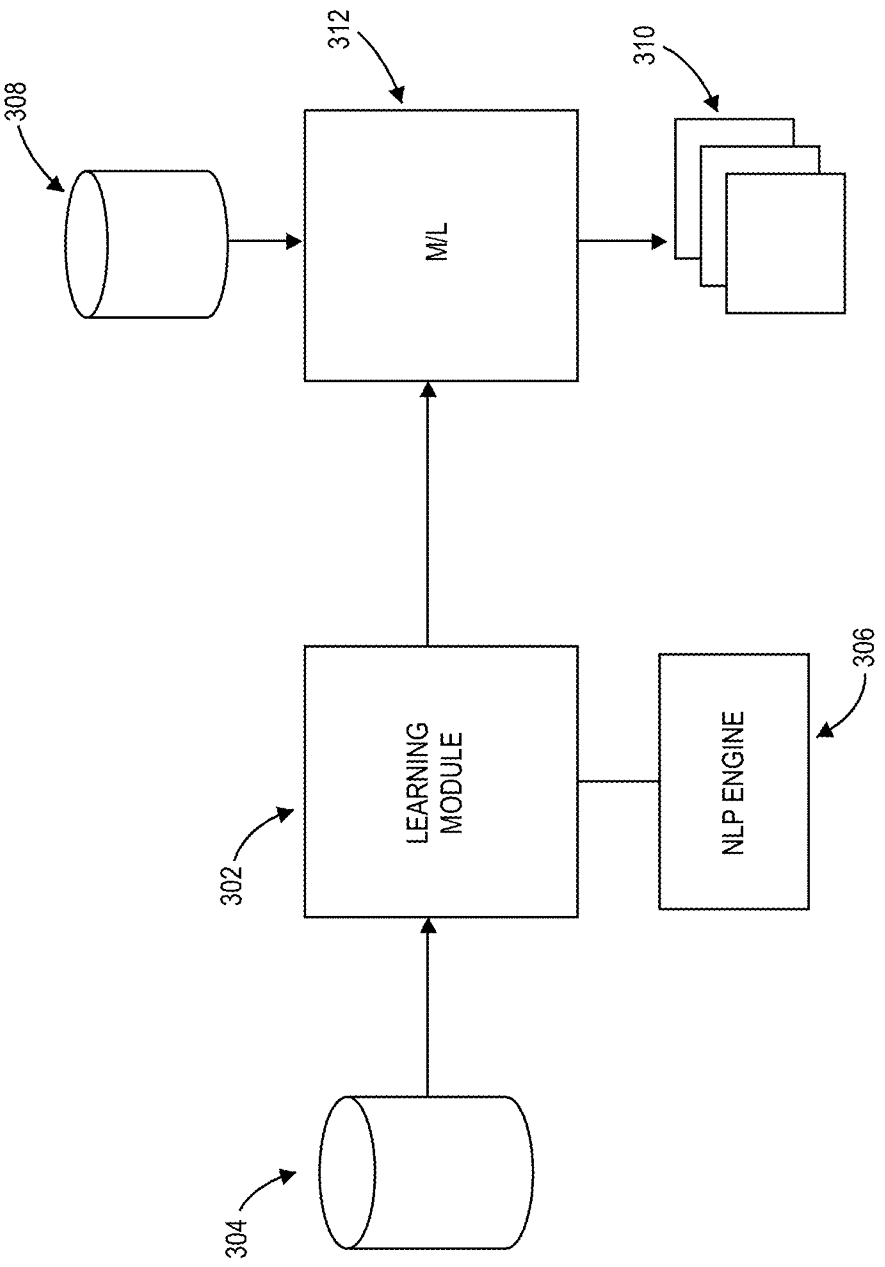
FIG. 3 depicts an exemplary machine learning system in accordance with embodiments of the invention.

Continuing on, FIG. 3 depicts an exemplary machine learning system, in accordance with embodiments of the invention. In some embodiments, the exemplary machine learning system may include machine learning model 312, generally corresponding to machine learning model 212 depicted in FIG. 2. Broadly, the machine learning system may train and utilize machine learning model 312 to generate a predictive score for an input. As described above, the predictive score may correspond to the similarity between a third-party specific question and/or answer and a standardized question and/or answer. Machine learning model 312 may be trained to utilize any number of criteria to determine the similarity between questions and or answers, as discussed below.

Machine learning model 312 may be any type of machine learning model now known or later developed, such as a supervised machine-learning system, an unsupervised machine-learning system, a rule-based system, a dictionary-based system, a bootstrapping system, a neural network system, a statistical system, a semantic role labeling system, a large language model, a generative machine learning system, a tuning of a large language model, a series of prompts to a large language model, a combination of the above-mentioned systems, and the like. In some embodiments, machine learning model 312 may be trained using learning module 302. Learning module 302 may receive training data from training data store 304. Training data store 304 may be any data store now known or later developed, including but not limited to an internal data store, an external data store, a cloud-based data store, a singular data store, a plurality of data stores, and the like.

Generally, the training data stored in training data store 304 and used by learning module 302 to train machine learning model 312 may be any suitable data set. In some embodiments, learning module 302 may utilize past standardized question-and-answer pairs, past third-party-specific question-and-answer pairs, third-party instructions, and the like. For example, learning module 302 may utilize past standardized question-and-answer pairs accepted by third parties in order to train machine learning model 312 to determine the similarity between questions and or answers accurately.

Further, in some embodiments, machine learning model 312 may parse and understand written human language in order to determine what a given question is asking. As such, learning module 302 may use natural language processing to train machine learning model 312. Machine learning model 212 may be trained using any natural language processing technique now known or later developed, including, but not limited to, name-entity recognition, relation extraction, text summarization, topic modeling, text classification, keyword extraction, lemmatization and stemming, and similar techniques. For example, learning module 302 may parse instructions provided with the third-party-specific questionnaire (using, for example, natural language processing or a large language model) to identify the information being solicited for a given question.

Upon being trained, machine learning model 312 may receive third-party data housed in third-party data store 306, generally corresponding to third-party data store 206 depicted in FIG. 2. In some embodiments, the third-party data received may be live data such that it is received in real-time from one or more third parties, such as third-party insurer 202 depicted in FIG. 2. As described above with regard to FIG. 2, machine learning model 312 may receive a plurality of third-party-specific question-and-answer pairs from a plurality of third parties.

After receiving one or more inputs, in some embodiments, machine learning model 312 may output predictive scores 308, the predictive scores 308 corresponding to particular questions and answers included in third-party data store 306. As described above, predictive score 308 may provide a score for each question in the standardized question list, where each predictive score quantifies how similar a given third-party specific question is to a given standardized question. For example, if a third-party-specific question is substantially identical to an existing standardized question, the predictive score may be 100%.

Broadly, predictive scores 308 may be based on any number of criteria for similarity, including, but not limited to, syntax, word choice, information sought, order, in the like. Predictive scores 308 may also be generated based on comparative analysis of the similarity of answers given by a large language model to a constructed prompt which includes the questions. Using predictive scoring, a rules management framework may determine which standardized question and/or answer to map a third-party specific question and/or answer to such that the system can present the question to a user and the answer will be accepted by the third party.

Figure 4:
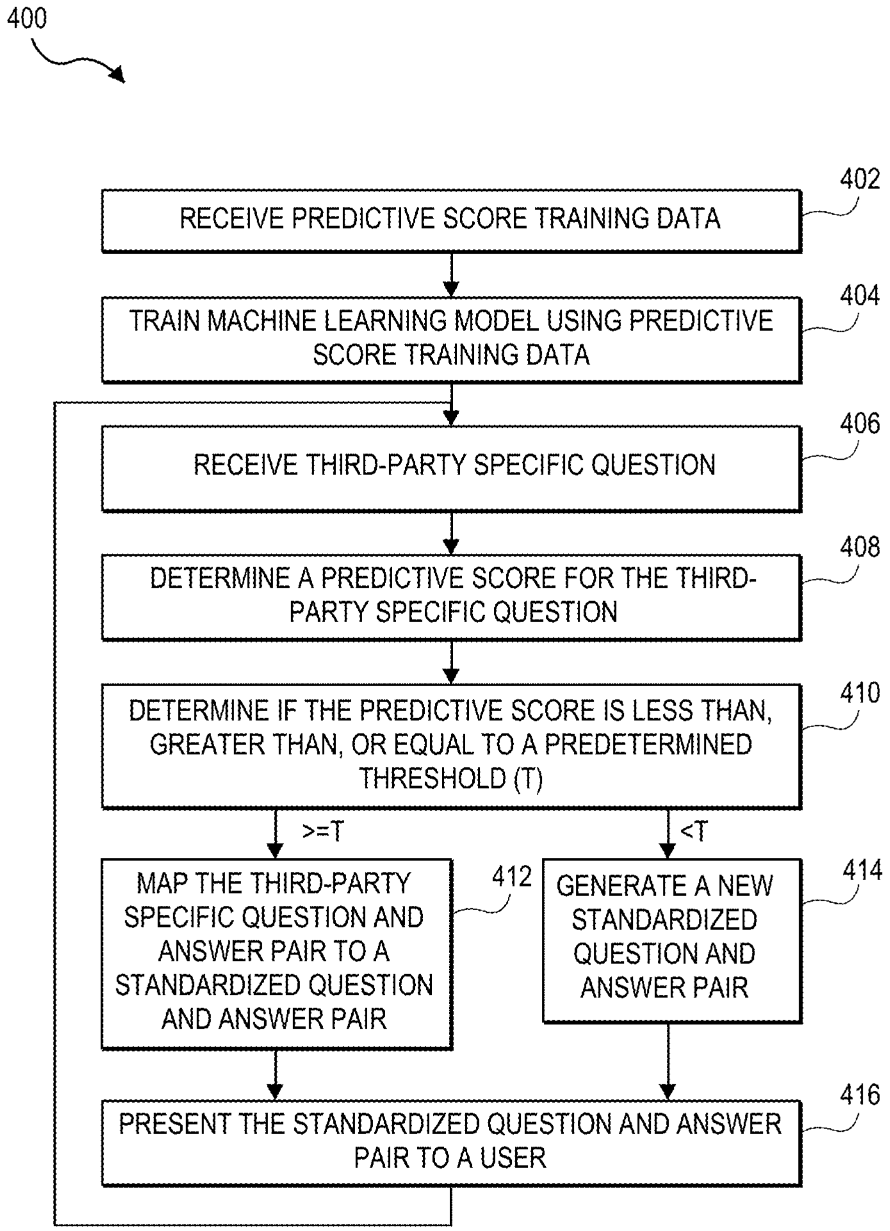
FIG. 4 depicts an exemplary flowchart for illustrating the operation of a method in accordance with embodiments of the invention.

Continuing on, FIG. 4 depicts an exemplary flowchart for illustrating the operation of a method, generally referred to by reference numeral 400, in accordance with embodiments of the invention. In step 402, predictive score training data may be received. In some embodiments, the predictive score training data may be previously successful question and answer mappings, where a successful mapping is one that is accepted by the greatest number of third parties such that the third parties may provide quotes. In some embodiments, the predictive score training data may be prior error detections, such as those detected by error detection module 218 depicted in FIG. 2.

In step 404, the machine learning model is trained using the predictive score training data. In some embodiments, the machine learning model is trained using a learning module, such as learning module 302 depicted in FIG. 3. The machine learning model may be trained using any type of learning, including, but not limited to, supervised and unsupervised learning. In some embodiments, the machine learning model may be trained to determine how similar a third-party-specific question is to the preexisting, standardized questions.

In step 406, a third-party-specific question-and-answer pair may be received. As described above with regard to FIG. 2, the third-party specific question-and-answer pair may be received from third-party insurer 202 through API 204. The third-party-specific question-and-answer pair may be received in real-time or may be received from a data store, such as third-party data store 206 depicted in FIG. 2.

In step 408, a predictive score for a given standard question for the third-party specific question is determined. As described above with regard to FIG. 2, the predictive score may be determined by a rules management framework, such as rules management framework 208 depicted in FIG. 2. In some embodiments, the predictive score may be determined utilizing a machine learning model, such as machine learning model 212 or machine learning model 312. The predictive score may be based on the similarity between the third-party-specific question and the standardized question. Similarly, predictive scores may be generated for the entirety of the standardized questions in order for the system to determine which standardized question is most similar to the third-party-specific question.

In step 410, it may be determined whether the predictive score is less than, greater than, or equal to a predetermined threshold. In some embodiments, the predetermined threshold is defined by an administrator, such as system administrator 216 depicted in FIG. 2. It is noted herein that the predictive score may be in any orientation. For example, the predetermined threshold may behave as a ceiling for the value of the predictive score, a floor for the value of the predictive score, and the like.

In step 412, if the predictive score is greater than or equal to a predetermined threshold, the third-party specific question-and-answer pair may be mapped to a standardized question-and-answer pair. For example, if the predictive score is 90% and the predetermined threshold is a predictive score to be at least 80%, then the third-party specific question may be mapped to the standardized question corresponding to the predictive score of 90%. In the event that multiple predictive scores are greater than the predetermined threshold for a given third-party specific question, in some embodiments, the standardized question corresponding to the greatest predictive score (or the lowest predictive score, if the threshold is a ceiling) may be the question to which the third-party specific question is mapped. In some embodiments, the third-party specific question-and-answer pair may be mapped to the standardized question-and-answer pair only if the predictive score is above the threshold and more than a predefined increment over the second-best standardized question-and-answer pair. If the predictive score is above the threshold but within the predefined increment of the second-best standardized question-and-answer pair, a new question may be generated (as discussed below with respect to step 414), or an existing question may be refined to better distinguish between the best standardized question-and-answer pair and the second-best standardized question-and-answer pair.

In step 414, if the predictive score is less than a predetermined threshold, a new standardized question-and-answer pair may be generated. In some embodiments, if all the predictive scores for a given third-party specific question are less than the predetermined threshold, this may indicate that none of the pre-existing standardized questions match the third-party specific question. Accordingly, a new standardized question-and-answer pair may be generated to correspond to the third-party-specific question. In some embodiments, it may be indicated to an administrator that no predictive score for a given third-party specific question exceeded the predetermined threshold, at which the system administrator may intervene and take any number of actions, including mapping the question manually or creating a new question.

In step 416, the standardized question-and-answer pair may be presented to a user. In some embodiments, the standardized question-and-answer pair is presented to user 222 via user interface 224 depicted in FIG. 2. Upon presenting the standardized question-and-answer pair to the user, the user may then answer the question with an answer corresponding to an acceptable answer provided by the standardized question-and-answer pairs. As a part of receiving the answer in step 416, the standard answer may be converted to the third-party-specific answer for one or more third-party insurers. Accordingly, the substance of the answer given by the user may then be presented to each third-party insurer requiring it such that the third party can provide a quote or indicate that more information may be needed. Further, the data received by presenting the user with the standardized question-and-answer pair may then be used to train the machine learning model to generate predictive scores.

Although the present disclosure has been described with reference to the embodiments illustrated in the attached drawing figures, it is noted that equivalents may be employed and substitutions made herein without departing from the scope of the present disclosure as recited in the claims.

Features described above as well as those claimed below may be combined in various ways without departing from the scope hereof. The following examples illustrate some possible, non-limiting combinations:

Clause 1. One or more non-transitory computer-readable media comprising computer-executable instructions that, when executed by at least one processor, perform a method of managing a standardized question and answer set, the method comprising: training a machine learning model to determine a predictive score based on a similarity level between a third-party specific question and a standardized question; receiving a third-party specific question and answer set from a third-party provider, the third-party specific question and answer set comprising the third-party specific question; determining, using a trained machine learning model, the predictive score for the third-party specific question from the third-party specific question and answer set, the predictive score associated with a similarity between the third-party specific question and the standardized question from the standardized question and answer set; determining if the predictive score exceeds a predetermined threshold; and in response to the predictive score exceeding the predetermined threshold, mapping the third-party specific question to the standardized question.

Clause 2. The one or more non-transitory computer-readable media of clause 1, wherein the method further comprises: in response to the predictive score being less than the predetermined threshold, generating a new standardized question corresponding to the third-party specific question, wherein the standardized question is an existing standardized question.

Clause 3. The one or more non-transitory computer-readable media of clause 1 or clause 2, wherein the method further comprises: developing an ordering of the standardized question and answer set such that one or more standardized questions from the standardized question and answer set are presented to a user in the ordering.

Clause 4. The one or more non-transitory computer-readable media of any of clause 1 through clause 3, wherein the ordering minimizes a number of standardized questions asked to the user.

Clause 5. The one or more non-transitory computer-readable media of any of clause 1 through clause 4, wherein the machine learning model is trained using prompt engineering.

Clause 6. The one or more non-transitory computer-readable media of any of clause 1 through clause 5, wherein the method further comprises: in response to the predictive score being less than the predetermined threshold, providing information indicative of the predictive score, wherein the information is provided to a system administrator.

Clause 7. The one or more non-transitory computer-readable media of any of clause 1 through clause 6, wherein the method further comprises: in response to providing the information indicative of the predictive score, receiving, from the system administrator a manual mapping of the third-party specific question.

Clause 8. A method for managing a standardized question and answer set, the method comprising: training a machine learning model to determine a predictive score based on a similarity level between a third-party specific question and an existing standardized question from the standardized question and answer set; receiving a third-party specific question and answer set from a third-party provider; determining, using a trained machine learning model, the predictive score for the third-party specific question from the third-party specific question and answer set, the predictive score associated with a similarity between the third-party specific question and the existing standardized question from the standardized question and answer set; determining if the predictive score exceeds a predetermined threshold; in response to the predictive score exceeding the predetermined threshold, mapping the third-party specific question to the existing standardized question; and in response to the predictive score being less than the predetermined threshold, generating a new standardized question corresponding to the third-party specific question.

Clause 9. The method of clause 8, the method further comprising: determining, using the trained machine learning model, a second predictive score for a third-party specific answer to the third-party specific question, the second predictive score associated with the similarity between the third-party specific answer and a standardized answer to the existing standardized question, wherein the predictive score is a first predictive score.

Clause 10. The method of clause 8 or clause 9, further comprising: monitoring a communication channel associated with the third-party provider; and receiving, through the communication channel, information indicative of an error.

Clause 11. The method of any of clause 8 through clause 10, further comprising: refining the machine learning model, wherein the machine learning model is refined based on the error.

Clause 12. The method of any of clause 8 through clause 11, wherein the machine learning model implements a large language model for determining requested information associated with the third-party specific question.

Clause 13. The method of any of clause 8 through clause 12, the method further comprising: determining, using the trained machine learning model, a second predictive score for a second third-party specific question from the third-party specific question and answer set, the predictive score associated with the similarity between the second third-party specific question and the existing standardized question from the standardized question and answer set, wherein the predictive score is a first predictive score and the third-party specific question is a first third-party specific question; determining whether a difference between the first predictive score and the second predictive score is less than a second predetermined threshold, wherein the predetermined threshold is a first predetermined threshold; and in response to the difference being less than the second predetermined threshold, providing an indication to a system administrator.

Clause 14. The method of any of clause 8 through clause 13, wherein the standardized question and answer set is associated with insurance underwriting.

Clause 15. A system for managing a standardized question and answer set, the system comprising: a rules mapping engine operable to map a third-party specific question and answer set to the standardized question and answer set; a machine learning model operable to determine a predictive score based on a similarity level between a third-party specific question from the third-party specific question and answer set and a standardized question from the standardized question and answer set; and one or more non-transitory computer-readable media comprising computer-executable instructions that, when executed by at least one processor, perform a method of managing the standardized question and answer set, the method comprising: receiving the third-party specific question and answer set from a third-party provider; determining, using the machine learning model, the predictive score for the third-party specific question from the third-party specific question and answer set, the predictive score associated with a similarity between the third-party specific question and the standardized question from the standardized question and answer set; determining if the predictive score exceeds a predetermined threshold; and in response to the predictive score exceeding the predetermined threshold, mapping, by the rules mapping engine, the third-party specific question to the standardized question.

Clause 16. The system of clause 15, further comprising: an error detection module operable to detect an error in the standardized question and answer set.

Clause 17. The system of clause 15 or clause 16, wherein the method further comprises: detecting, by the error detection module, the error in the standardized question and answer set after the standardized question and answer set, wherein the error is detected after a set of user answers associated with the standardized question and answer set is presented to the third-party provider.

Clause 18. The system of any of clause 15 through clause 17, wherein detecting the error comprises: receiving, from the third-party provider, information indicative of the error in the standardized question and answer set.

Clause 19. The system of any of clause 15 through clause 18, wherein the method further comprises: in response to the predictive score being less than the predetermined threshold, generating, by the rules mapping engine, a new standardized question corresponding to the third-party specific question, wherein the standardized question is an existing standardized question.

Clause 20. The system of any of clause 15 through clause 19, wherein the third-party provider is an entity engaging in underwriting.

Having thus described various embodiments of the present disclosure, what is claimed as new and desired to be protected by Letters Patent includes the following:

1. One or more non-transitory computer-readable media comprising computer-executable instructions that, when executed by at least one processor, perform a method of managing a standardized question-and-answer set, the method comprising:

training a machine learning model to determine a predictive score based on a similarity level between a third-party-specific question and a standardized question;

receiving, through an application programming interface associated with a third-party-specific question-and-answer set from a third-party provider, the third-party-specific question-and-answer set comprising the third-party-specific question and a plurality of third-party-specific answer values accepted by the third-party provider;

determining, using a trained machine learning model, a plurality of predictive scores for the third-party-specific question, each predictive score off the plurality of predictive scores being associated with a similarity between the third-party-specific question and a respective standardized question from the standardized question-and-answer set; determining if the predictive score exceeds a predetermined threshold;

determining whether a difference between the highest predictive score and a second-highest predictive score of the plurality of predictive scores exceeds a second predetermined threshold;

in response to determining that the highest predictive score exceeds the first predetermined threshold and that the difference exceeds the second predetermined threshold, mapping the third-party-specific question to the corresponding standardized question by storing a mapping record associating the third-party-specific question, the corresponding standardized question, at least one of the third-party-specific answer values, and at least one standardized answer value of the corresponding standardized question; and generating, based on the mapping record, an answer-transformation rule for converting a user-provided standardized answer corresponding to the corresponding standardized question into a third-party-specific answer value accepted by the third-party provider.

2. The one or more non-transitory computer-readable media of claim 1, wherein the method further comprises:

responsive to the highest predictive score being less than the first predetermined threshold, generating a new standardized question corresponding to the third-party-specific question, wherein the new standardized question is different from each existing standardized question in the standardized question-and-answer set.

3. The one or more non-transitory computer-readable media of claim 1, wherein the method further comprises:

developing an ordering of the standardized question and answer set such that one or more standardized questions from the standardized question and answer set are presented to a user in the ordering.

4. The one or more non-transitory computer-readable media of claim 3, wherein the ordering minimizes a number of standardized questions asked to the user.

5. The one or more non-transitory computer-readable media of claim 1, wherein the machine learning model is trained using prompt engineering.

6. The one or more non-transitory computer-readable media of claim 1, wherein the method further comprises:

responsive to the predictive score being less than the predetermined threshold, providing information indicative of the predictive score, wherein the information is provided to a system administrator.

7. The one or more non-transitory computer-readable media of claim 6, wherein the method further comprises:

responsive to providing the information indicative of the predictive score, receiving, from the system administrator a manual mapping of the third-party-specific question.

8. A method for managing a standardized question-and-answer set, the method comprising:

training a machine learning model to determine a predictive score based on similarity levels between a third-party-specific questions and an existing standardized question from the standardized question-and-answer set;

receiving, through an application programing interface associated with a third-party-specific question-and-answer set from a third-party provider, the third-party-specific question-and-answer set comprising a provider identifier, a third-party-specific question, and a plurality of third-party-specific answer values accepted by the third-party provider for the third-party-specific question;

determining, using the trained machine learning model, a plurality of predictive scores for the third-party-specific question from the third-party-specific question and answer set, each predictive score of the plurality of predictive scores being associated with a similarity between the third-party-specific question and a respective standardized question from the standardized question-and-answer set;

identifying a highest predictive score from the plurality of predictive scores, a corresponding standardized question associated with the highest predictive score, and a second-highest predictive score from the plurality of predictive scores;

determining whether the highest if the predictive score exceeds a first predetermined threshold;

determining whether a difference between the highest predictive score and the second-highest predictive score exceeds a second predetermined threshold;

in response to determining that the highest predictive score exceeds the first predetermined threshold and that the difference exceeds the second predetermined threshold, mapping the third-party-specific question to the corresponding standardized question by storing a mapping record associating the provider identifier, the third-party-specific question, the corresponding standardized question, at least one third-party-specific answer value from the plurality of third-party-specific answer values, and at least one standardized answer value of the corresponding standardized question;

generating, based on the mapping record, an executable answer-transformation rule configured to convert a user-provided standardized answer corresponding to the corresponding standardized question into one of the third-party-specific answer values accepted by the third-party provider;

receiving, through a user interface, the user-provided standardized answer corresponding to the corresponding standardized question;

executing the executable answer-transformation rule to convert the user-provided standardized answer into the one of the third-party-specific answer values;

transmitting, through the application programming interface, the one of the third-party-specific answer values to the third-party provider; and responsive to the highest predictive score being less than the first predetermined threshold, generating a new standardized question corresponding to the third-party-specific question.

9. The method of claim 8, the method further comprising:

determining, using the trained machine learning model, a second predictive score for a third-party-specific answer to the third-party-specific question, the second predictive score associated with the similarity between the third-party-specific answer and a standardized answer to the existing standardized question, wherein the predictive score is a first predictive score.

10. The method of claim 8, further comprising:

monitoring a communication channel associated with the third-party provider; and receiving, through the communication channel, information indicative of an error.

11. The method of claim 10, further comprising:

refining the machine learning model, wherein the machine learning model is refined based on the error.

12. The method of claim 8, wherein the machine learning model implements a large language model for determining requested information associated with the third-party-specific question.

13. The method of claim 8, the method further comprising:

determining, using the trained machine learning model, a second predictive score for a second third-party-specific question from the third-party-specific question-and-answer set, the predictive score associated with the similarity between the second third-party-specific question and the existing standardized question from the standardized question-and-answer set, wherein the predictive score is a first predictive score and the third-party-specific question is a first third-party-specific question;

determining whether a difference between the first predictive score and the second predictive score is less than a second predetermined threshold, wherein the predetermined threshold is a first predetermined threshold; and responsive to the difference being less than the second predetermined threshold, providing an indication to a system administrator.

14. The method of claim 8, wherein the standardized question-and-answer set is associated with insurance underwriting.

15. A system for managing a standardized question-and-answer set, the system comprising:

a rules mapping engine operable to map a third-party-specific question-and-answer set to the standardized question-and-answer set by storing mapping records and executable answer-transformation rules;

a machine learning model operable to determine predictive scores based on similarity levels between third-party-specific questions from the third-party-specific question-and-answer set and standardized questions from the standardized question-and-answer set; and one or more non-transitory computer-readable media comprising computer-executable instructions that, when executed by at least one processor, perform a method of managing the standardized question-and-answer set, the method comprising:

receiving, through an application programming interface associated with a third party provider, the third-party-specific question and answer set from the third-party provider, the third-party-specific question-and-answer set comprising a provider identifier, a third-party-specific question, and a plurality of third-party-specific answer values accepted by the third-party provider for the third-party-specific question;

determining, using the machine learning model, a plurality of predictive scores for the third-party-specific question from the third-party-specific question-and-answer set, each predictive score of the plurality of predictive scores being associated with a similarity between the third-party-specific question and a respective standardized question from the standardized question-and-answer set;

determining whether the highest predictive score exceeds a first predetermined threshold;

determining whether a difference between the highest predictive score and the second-highest predictive score exceeds a second predetermined threshold;

responsive to determining that the highest predictive score exceeds the first predetermined threshold and that the difference exceeds the second predetermined threshold, mapping, by the rules mapping engine, the third-party-specific question to the corresponding standardized question by storing a mapping record associating the provider identifier, the third-party-specific question, the corresponding standardized question, at least one third-party-specific answer value from the plurality of third-party-specific answer values, and at least one standardized answer value of the corresponding standardized question;

generating, by the rules mapping engine based on the mapping record, an executable answer-transformation rule configured to convert a user-provided standardized answer corresponding to the corresponding standardized question into one of the third-party-specific answer values accepted by the third-party provider;

receiving, through a user interface, the user-provided standardized answer corresponding to the corresponding standardized question;

executing the executable answer-transformation rule to convert the user-provided standardized answer into the one of the third-party-specific answer values; and transmitting, through the application programming interface, the one of the third-party-specific answer values to the third-party provider.

16. The system of claim 15, further comprising:

an error detection module operable to detect an error in the standardized question-and-answer set.

17. The system of claim 16, wherein the method further comprises:

detecting, by the error detection module, the error in the standardized question-and-answer set after a set of user answers associated with the standardized question-and-answer set is transformed into third-party-specific answer values and presented to the third-party provider.

18. The system of claim 17, wherein detecting the error comprises:

receiving, from the third-party provider, information indicative of the error in the standardized question-and-answer set.

19. The system of claim 15, wherein the method further comprises:

responsive to the highest predictive score being less than the first predetermined threshold, generating, by the rules mapping engine, a new standardized question corresponding to the third-party-specific question, wherein the new standardized question is different from each existing standardized question in the standardized question-and-answer set.

20. The system of claim 15, wherein the third-party provider is an entity engaging in underwriting.

* * * * *